United States Patent
Li et al.

(10) Patent No.: US 7,719,245 B2
(45) Date of Patent: May 18, 2010

(54) METHODS AND APPARATUS TO PROVIDE SELF-TRACKING PRE-DRIVER CONTROLS

(75) Inventors: Huijuan Li, Plano, TX (US); Md Abidur Rahman, Allen, TX (US); Brett E. Smith, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 365 days.

(21) Appl. No.: 11/937,282

(22) Filed: Nov. 8, 2007

(65) Prior Publication Data

US 2009/0121702 A1    May 14, 2009

(51) Int. Cl.
*G05F 1/44* (2006.01)
*G05F 1/56* (2006.01)

(52) U.S. Cl. .................. 323/282; 323/284; 323/285; 323/351

(58) Field of Classification Search .......... 323/282, 323/284, 285, 286, 351
See application file for complete search history.

(56) References Cited

U.S. PATENT DOCUMENTS

| 6,356,466 | B1 | 3/2002 | Smidt et al. |
| 6,774,508 | B2 | 8/2004 | Ballantyne et al. |
| 7,038,514 | B2 * | 5/2006 | Leith et al. ............ 327/198 |
| 7,161,336 | B2 * | 1/2007 | Sakai et al. ........... 323/271 |
| 7,265,679 | B2 * | 9/2007 | Mosher .................. 340/662 |

* cited by examiner

*Primary Examiner*—Bao Q Vu
(74) *Attorney, Agent, or Firm*—William B. Kempler; Wade J. Brady, III; Frederick J. Telecky, Jr.

(57) ABSTRACT

Methods and apparatus for a self-tracking high-side pre-driver control are described. In an example, a method is described comprising charging a first terminal associated with a first capacitive element to a first voltage with respect to ground and a second terminal associated with a second capacitive element to a second voltage with respect to ground, changing the first voltage and the second voltage with respect to ground by changing a swing voltage, selecting one of the first voltage or the second voltage based on a first switched-mode power supply topology or a second switched-mode power supply topology and driving a transistor using the selected voltage.

14 Claims, 4 Drawing Sheets

METHODS AND APPARATUS TO PROVIDE SELF-TRACKING PRE-DRIVER CONTROLS

FIELD OF THE DISCLOSURE

This disclosure relates generally to pre-driver supplies and, more particularly, to methods and apparatus to provide self-tracking pre-driver controls.

BACKGROUND

A switched-mode power supply voltage regulator uses energy storage elements (e.g., capacitors, inductors) and switching elements (e.g., transistors) to generate a regulated output voltage from an input voltage. In particular, a boost regulator generates an output voltage that is generally higher than the boost regulator input voltage, while buck-boost (also referred to as inverted boost) regulators may have an output voltage that is higher or lower than the buck-boost regulator input voltage and may also be of opposite polarity.

A switched-mode power supply repeatedly switches between two states: an on-state and an off-state. During the on-state, the regulator input voltage has a direct electrical path to charge an energy storage element and/or to power a load. During the off-state, the input is electrically disconnected from the charged energy storage element, which discharges the stored energy to provide power to the load. Typically, one or more transistors act as the switching elements to control the timing and duration of the on-states and the off-states. The states of the transistors may be controlled by driver circuits, which turn the transistors on and off according to an input signal. The output voltage may be controlled by the frequency and relative duration of the on and off-states.

Within an integrated circuit (IC), die area can be a scarce commodity. A frequent goal of IC fabrication is to make the components on the die as small as possible. A limitation of smaller components is that the amount of semiconductor material used in a semiconductor device decreases. Thus, less energy is required to destroy the device.

Currently, for a switched-mode power supply to work in boost and buck-boost modes of operation, the designer uses two pre-driver circuits per output transistor. In an example case having two output transistors in a regulator, four pre-driver circuits are required. Additionally, the pre-drivers must be independent of each other so that when one pre-driver is active (e.g., the boost mode pre-driver), the other pre-driver (e.g., the buck-boost mode pre-driver) is disconnected to avoid damage. Multiple pre-drivers require very complex pre-driver control circuitry at the expense of die space, which may substantially increase the size of the circuit.

DETAILED DESCRIPTION

Figure 1:
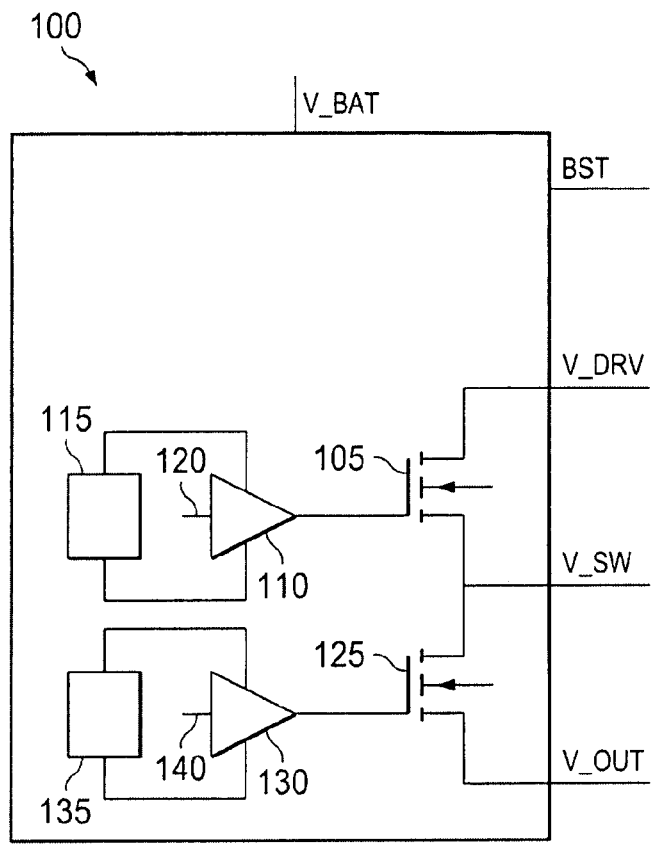
FIG. 1 is a schematic diagram of an example switched-mode power supply that may be configured for use in boost and buck-boost modes.

Certain examples are shown in the above-identified figures and described in detail below. In describing these examples, like or identical reference numbers may be used to identify common or similar elements. The figures are not necessarily to scale and certain features and certain views of the figures may be shown exaggerated in scale or in schematic for clarity and/or conciseness. Although the following discloses example methods and apparatus, it should be noted that such methods and apparatus are merely illustrative and should not be considered as limiting. For example, it is contemplated that any form of logic may be used to implement the systems, subsystems or methods herein. Logic may include, for example, circuit implementations that are made exclusively in dedicated hardware (e.g., circuits, transistors, logic gates, hard-coded processors, programmable array logic (PAL), application-specific integrated circuits (ASICs), etc.), exclusively in software, exclusively in firmware, or some combination of hardware, firmware, and/or software. Accordingly, while the following describes example methods and apparatus, persons of ordinary skill in the art will readily appreciate that the examples are not the only way to implement such apparatus.

The example methods and apparatus described herein can be used to control power to a pre-driver used in a switched-mode power supply to ensure that the pre-driver does not output a voltage that will damage the output transistor driven by the pre-driver. Controlling power to the pre-driver can be accomplished using one pre-driver control per pre-driver, and, in an example, both boost and buck-boost topologies can be supported by each pre-driver. In an example, a first capacitor is charged at a first bootstrap circuit and a second capacitor is charged at a second bootstrap circuit during the charge phase of either a boost topology or a buck-boost topology. One terminal of each of the two capacitors, as well as a lower reference of the high-side pre-driver and the source of a high-side field-effect transistor (FET), are electrically connected to a swing voltage terminal (V_SW).

During a charge phase of either the boost or the buck-boost configuration, a turn-on voltage is applied to the gate of a low-side FET, generating a conductive channel from V_SW to an output terminal (V_OUT). During a discharge phase the low-side FET disconnects the conductive channel between V_SW and V_OUT, causing the voltage at V_SW with respect to ground to increase. Along with the increase in V_SW there is a corresponding increase in the voltages on the first plates of the two capacitors with respect to ground. The charged plates of the two capacitors are each connected to separate input terminals of a switching element, which selects the lower voltage with respect to ground and outputs a voltage to the pre-driver based on the selected input voltage. In the illustrated example, the switching element is embodied by an n-channel FET. The source voltage the FET is used as the positive voltage supply for the high-side pre-driver.

As a result, the high-side pre-driver supply voltage and, therefore, the gate-source voltage of the high-side FET, is kept within a desired nominal range independent of a boost or buck-boost topology. It is also contemplated by those of ordinary skill that the boost and buck-boost modes are not the only switched-mode power supply topologies that may be used with the described systems.

FIG. 1 is a schematic diagram of an example switched-mode power supply 100 that may be configured for use in boost and buck-boost modes. A power input terminal (V_BAT) receives power from an external source (e.g., a battery, a linear voltage regulator, etc.). A bootstrap terminal (BST) is typically coupled to a swing voltage terminal (V_SW) via a bootstrap capacitor (not shown). One of a drive voltage terminal (V_DRV) and an output voltage terminal (V_OUT) may act as the output to a load (not shown), based on whether a boost or a buck-boost topology is used.

A high-side n-channel FET 105 has a drain coupled to the V_DRV terminal and a source coupled to the V_SW terminal. The high-side FET 105 is driven by the output of a high-side pre-driver 110, which supplies a voltage to the gate of the high-side FET 105. The high-side pre-driver control 115 acts as a power regulator for the high-side pre-driver 110, defining the positive voltage supply for the high-side pre-driver 110 output to the gate of the high-side FET 105. The high-side pre-driver 110 also has an input 120, which may be implemented using one or more terminals, to control the output of the driver within the limits set by the high-side pre-driver control 115. The V_SW terminal is also connected to the drain of a low-side n-channel FET 125.

Further, the source of the low-side FET 125 is connected to the V_OUT terminal. A low-side pre-driver 130, which may be identical, similar to, more or less complex than the high-side pre-driver 110, supplies a voltage to the gate of the low-side FET to turn it on or off. The low-side pre-driver 130 is powered by a low-side pre-driver control 135, which may typically be less complex than the high-side pre-driver control 115. The low-side pre-driver 130 has an input 140, which may be implemented using one or more terminals, to control the output of the low-side FET 125. The input(s) 120 to the high-side pre-driver 110 and the input(s) 140 to the low-side pre-driver 130 may be controlled by logic. The logic, among other things, controls the timing of the on-states and off-states of the pre-drivers and the FETs. Alternatively, the logic may be replaced by an oscillator, pulse width modulation, user input, or other periodic or aperiodic input.

In operation, the example switched-mode power supply 100 repeatedly switches between two phases: a charge phase and a discharge phase. The charge phase occurs when one of the low-side or high-side transistors is in the off-state and the other is in the on-state. Which of the low-side and high-side transistors is in the low-state during the charge phase depends on the topology (e.g., boost or buck-boost) used, which is dictated by the external component configuration coupled to the example switched-mode power supply 100. During the charge phase, capacitors are charged to a pre-determined voltage.

After the charge phase, the switched-mode power supply 100 enters the discharge phase. The charged components associated with the high-side pre-driver control 115 discharge, which supplies the necessary voltage to the high-side pre-driver 110, which drives the high-side FET 105. External components and loads (not shown) are connected to the terminals BST, V_DRV, V_SW and V_OUT depending on the desired switched-mode power supply topology (e.g., boost or buck-boost). The pre-driver controls 115 and 135 are designed to supply voltages to the pre-drivers 110 and 130, respectively, that are sufficient to drive, but do not cause damage to, the FETs 105 and 125.

Figure 2:
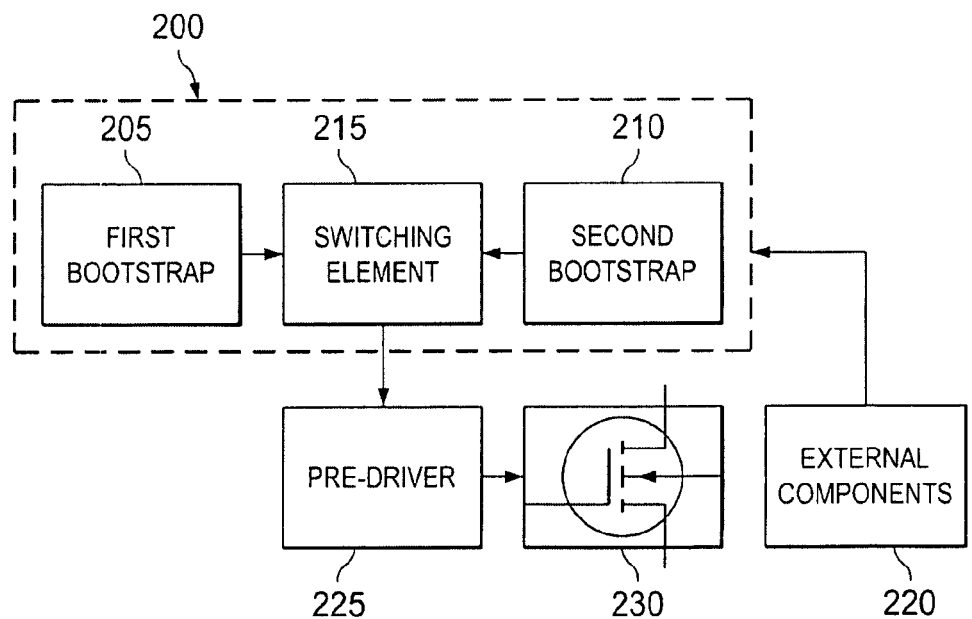
FIG. 2 is a block diagram representative of an example apparatus to implement a self-tracking pre-driver control.

FIG. 2 is a block diagram representative of an example self-tracking pre-driver control 200 such as, for example, the high-side pre-driver control 115 and/or the low-side pre-driver control 135 as shown in FIG. 1. The pre-driver control 200 may include circuitry representing a first bootstrap 205, a second bootstrap 210, and a switching element 215. External components 220 are arranged to form the switched-mode power supply topology (e.g., boost or buck-boost). During the charge and discharge phases, the bootstraps 205 and 210 are charged or discharged to desired voltages depending on the topology. For instance, the voltage at the first bootstrap 205 in boost mode may or may not be the same as the voltage at the first bootstrap in buck-boost mode. For example, the voltage at the first bootstrap 205 may be greater that the voltage at the second bootstrap 210 in buck-boost mode while the voltage at the second bootstrap 210 is greater than the voltage at the first bootstrap 205 in boost mode. The switching element 215 may select the voltage from one of the bootstraps 205 or 210 based on, for example, which of the bootstraps 205 or 210 has the higher voltage or the lower voltage.

After selecting the voltage from one of the bootstraps 205 or 210, the switching element 215 outputs the selected voltage, which may be modified (e.g., for a diode forward voltage drop), as the positive voltage supply for a pre-driver 225, which may correspond to the high-side pre-driver 110 or the low-side pre-driver 130 as shown in FIG. 1. The pre-driver 225 utilizes the voltage from the switching element 215, a reference voltage (e.g., the V_SW terminal from FIG. 1.) and one or more input signals (e.g., the input signal(s) 120 or 140) and outputs a voltage to the gate of a FET 230. The voltage at the gate of the FET 230 generates a corresponding output (e.g., a drain-source resistance). The output can be configured to allow a certain level of current to flow through the FET 230 and generate an output voltage at the drain or source to drive a load (not shown).

Figure 3:
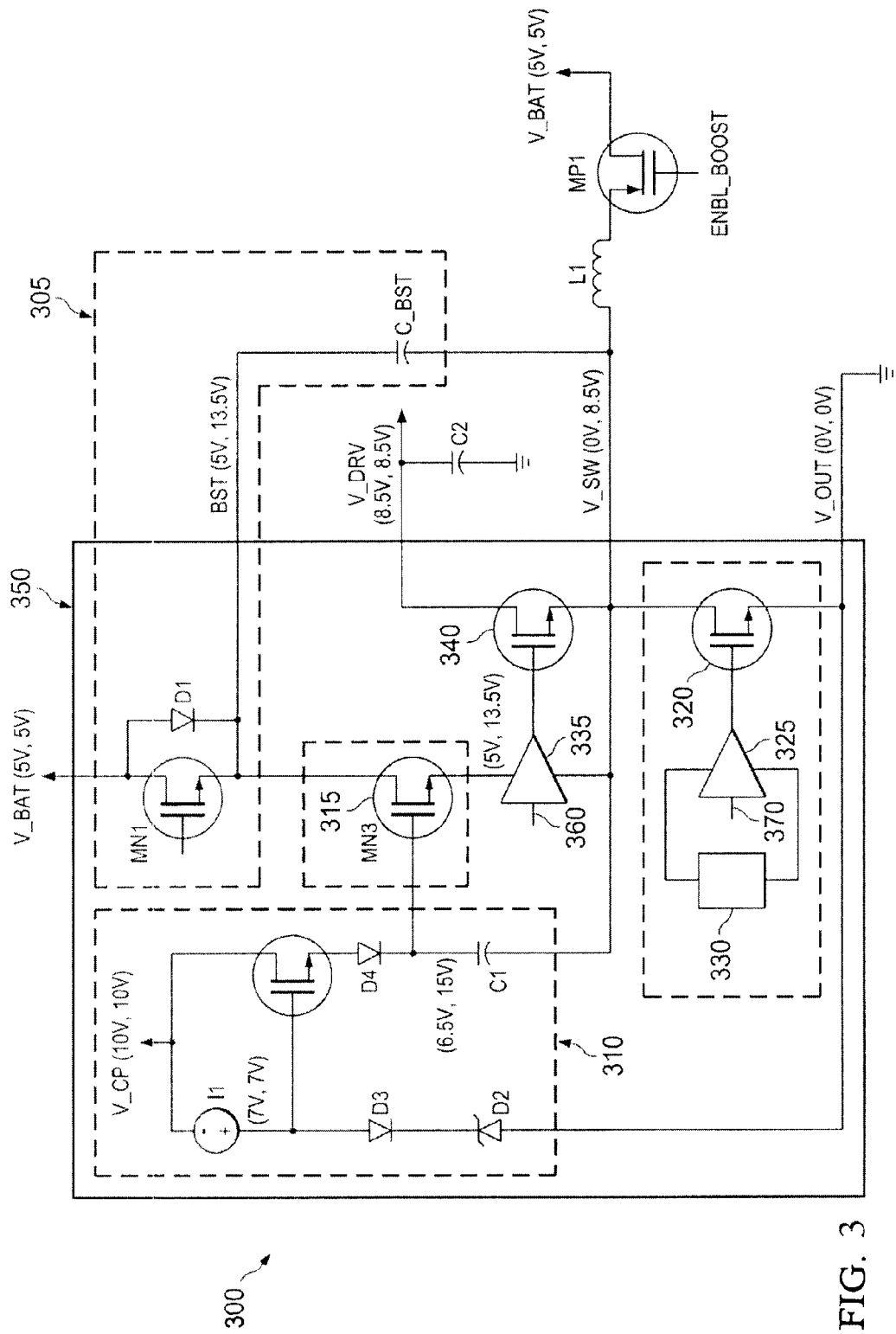
FIG. 3 is a schematic diagram of an example switched-mode power supply utilizing a self-tracking high-side pre-driver control configured in boost mode.

FIG. 3 is a schematic diagram of an example switched-mode power supply 300 utilizing a self-tracking high-side pre-driver control configured in boost mode. The example power supply 300 may be implemented using a combination of integrated circuits (ICs) and/or discrete components. In the example of FIG. 3, certain elements are shown internal to an integrated circuit 350 and other elements are shown as external to the integrated circuit 350. Some of the elements, when considered together, may be considered to act as a first bootstrap 305 (corresponding to the first bootstrap 205 as shown in FIG. 2), a second bootstrap 310 (corresponding to the second bootstrap 210 as shown in FIG. 2), or a switching element 315 (corresponding to the switching element 215 as shown in FIG. 2). FIG. 3 shows the detail of the high-side pre-driver control, but also shows a low-side FET 320, a low-side pre-driver 325 and a low-side pre-driver control 330 in block form.

Figure 4:
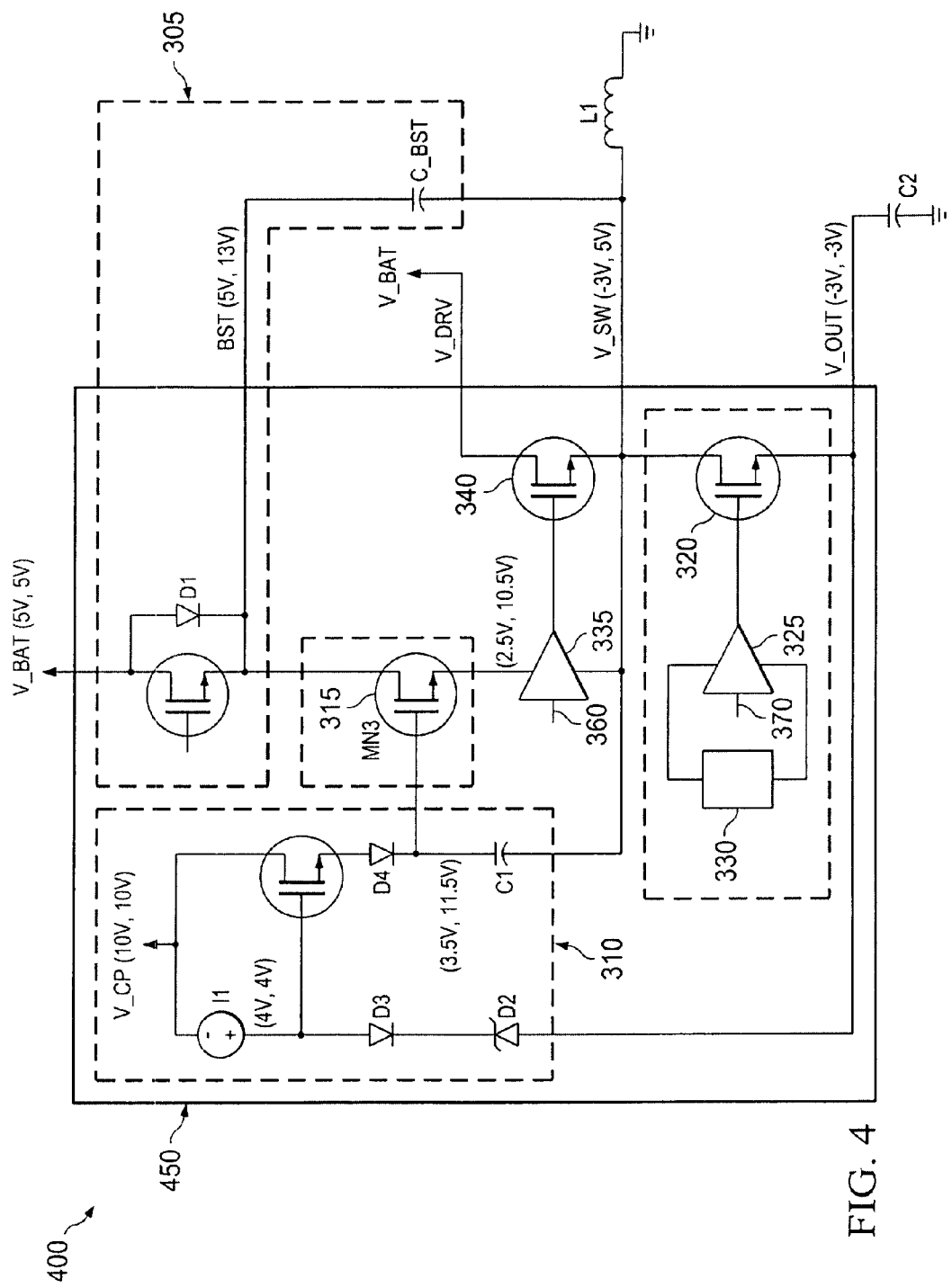
FIG. 4 is a schematic diagram of an example switched-mode power supply utilizing a self-tracking high-side pre-driver control configured in buck-boost mode.

Turning now to an example of the high-side pre-driver control operation in boost mode, an external power source (e.g., a battery V_BAT) is a constant 5 V DC source with respect to ground. In this example implementation, the process used to manufacture the integrated circuit 350 has a breakdown voltage of 7 V, thereby restricting the maximum voltage (i.e., gate-source voltage) on the high-side FET 315 to be less than 7 V. In FIGS. 3 and 4, voltages are marked at certain nodes in the form (X,Y), where X is the final voltage of a charge phase and Y is the final voltage of a discharge phase.

The charging phase occurs while the low-side FET 320 is turned on (i.e., has a relatively low drain-source resistance, allowing the flow of current from the low-side FET 320 drain to the low-side FET 320 source). This effectively lowers the voltage of a swing voltage terminal (V_SW) to the voltage of the output voltage terminal (V_OUT), which is connected to a ground terminal (e.g., 0 V with respect to ground).

A first terminal of an external inductor L1 is connected to V_SW and another terminal of the inductor L1 is connected to a source terminal of a switching element MP1. A drain terminal is connected to V_BAT at 5 V with respect to ground. A gate terminal of MP1 has an input voltage ENBL_BOOST, which allows or prevents a flow of current from the first to the second terminal in MP1 based on its voltage. A current flowing through MP1 further flows through and stores energy in the inductor L1 during the charge phase.

Also, during the charge phase, an external capacitor C_BST having one terminal connected to V_SW is charged to approximately 5 V (across the terminals) by V_BAT via a switching diode D1. Also connected to the V_SW terminal are the source of the high-side FET 340 and the negative voltage supply terminal of the high-side pre-driver 335. A FET MN1, the diode D1 and the capacitor B_CST make up one bootstrap 305. The second bootstrap 310 is constructed using diodes D3 and D4, a zener diode D2 having a breakdown voltage of 6.5 V, a current source I1, an n-channel FET MN2, a capacitor C1, and a charge pump voltage (V_CP). According to the illustrated example, V_CP is at twice the voltage with respect to ground as V_BAT, or about 10 V. The current source forces current through D2 and D3, causing the gate voltage of MN2 to be approximately constant at 7 V (D2 zener voltage and D3 forward voltage). The source voltage of MN2 follows the gate voltage (less a small forward voltage) and C1 is charged to approximately 6.5 V (MN2 source voltage less D4 forward voltage).

At the beginning of the discharge phase, the low-side FET 320 is turned off by the low-side pre-driver 325, causing a very high drain-source resistance and effectively cutting off current flow through the low-side FET 320. The voltage with respect to ground at V_SW shifts to the output at V_DRV (e.g., 8.5V). Due to the jump in the reference voltage with respect to ground, the voltage with respect to ground on the positively charged plates of C_BST and C1 increase to 13.5 V and 15 V, respectively. The voltage at the drain of MN3 is tied to the voltage at the positively charged plate of C_BST and the voltage at the gate of MN3 is tied to the voltage at the positively charged plate of C1. The source voltage of MN3 follows the lower of the drain and gate, and therefore MN3 may act as the switching element 315. MN3 may correspond to the switching element 215 in FIG. 2. The input terminals 360 and 370 to the pre-drivers 335 and 325, respectively, control the outputs to the gates of the power FETs 340 and 320 within the supply range provided by the pre-driver controls (corresponding to input terminals 120 and 140 as shown in FIG. 1).

The selected voltage (i.e., 13.5 V from the drain of MN3) is used as the positive voltage supply for a high-side pre-driver 335 (which may correspond to the pre-drivers 115 in FIG. 1 and/or 225 in FIG. 2) and V_SW (i.e., 8.5 V with respect to ground) is used as the negative voltage supply for the high-side pre-driver 335. The difference between these voltages is approximately 5 V, which is within the required range of voltage to safely drive a high-side FET 340 (which may correspond to the high-side FET 105 in FIG. 1 or the FET 230 in FIG. 2). By connecting the lower source terminal of the high-side pre-driver 335 and the source of the high-side FET 340, the maximum gate-source voltage of the high-side FET 340 may be controlled by limiting the positive voltage supply of the high-side pre-driver 335. The voltage at V_DRV is the output to a load (not shown), which is typically filtered by one or more capacitors C2 to reduce ripple. When the high-side FET 340 is turned on by the high-side pre-driver 335, the energy storage element L1 may discharge to provide power to the load. As subsequently shown, the example high-side pre-driver control shown may also be used with a different switched-mode power supply configuration to power the high-side pre-driver 335.

FIG. 4 is a schematic diagram of an example switched-mode power supply 400 utilizing a self-tracking high-side pre-driver control configured in buck-boost mode. As described in the example of FIG. 3, certain elements are shown internal to the integrated circuit 350 and other elements are shown as external to the integrated circuit. The elements described using reference numbers identical to those of FIG. 3 reflect how a different configuration of external components allows the same internal components to operate using a different input (e.g., buck-boost mode instead of boost mode) and generate a supply voltage for the high-side pre-driver 335 within the range required to safely drive the high-side FET 340.

In the example of FIG. 4, it is contemplated that the example power supply 400 has the same requirements and supplies as the example power supply 300 shown in connection with FIG. 3. To be precise, V_BAT is a 5 V DC source with respect to ground, V_CP supplies 10 V with respect to ground, and the breakdown voltage of the high-side FET 340 is 7 V. However, it should be noted that the voltages used in the buck-boost configuration are closer to the ground potential (e.g., 0 V) and V_CP may be adjusted accordingly without affecting the operation of the power supply 400. Additionally, in the example configuration the V_OUT pin is used as the buck-boost output (instead of V_DRV) with a DC voltage at −3 V with respect to ground.

As in the example described above in connection with FIG. 3, during the charge phase the low-side FET 320 provides a low-resistance current path from V_SW to V_OUT, which, in this case, causes V_SW to drop to −3 V. An energy storage device (e.g., the inductor L1) connects a ground terminal to V_SW. In buck-boost mode, contrary to the operation in boost mode, energy is stored in L1 during the discharge phase as explained below. During the charge phase, L1 discharges the energy stored in it from a previous discharge phase through the ground terminal to power the load.

Also during the charge phase, the external capacitor C_BST in the first bootstrap 305 having one terminal connected to V_SW is charged to approximately 8 V by V_BAT via the switching diode D1 (5 V at V_BAT less −3 V at V_SW). In the second bootstrap 310, the capacitor C1 is charged to 6.5 V across the terminals. The current source forces current through D1 and D2, causing the gate voltage to be constant at approximately 4 V (D2 breakdown voltage and D1 forward voltage). The source voltage of MN2 follows the gate voltage (less a small forward voltage) and therefore C1 is charged to approximately 6.5 V (MN2 source voltage less D3 forward voltage, less −3 V at V_SW). The positively charged plate of C1 connected to the gate of MN3 has a voltage of 3.5 V with respect to ground.

At the beginning of the discharge phase, the low-side FET 320 is turned off by the low-side pre-driver 325, causing a very high drain-source resistance and effectively cutting off current flow through the low-side FET 320. The voltage with respect to ground at V_SW shifts to 5 V. As a result of the jump in V_SW, the voltages with respect to ground on the positively charged plates of C_BST and C1 shift to 13.5 V and 11.5 V, respectively.

The voltage at the drain of MN3 is tied to the voltage at the positively charged plate of C_BST and the voltage at the gate of MN3 is tied to the voltage at the positively charged plate of C1. The source voltage of MN3 follows the lower of the drain and gate, and therefore MN3 may act as the switching element 315, corresponding to the switching element 215 in FIG. 2. The input terminals 360 and 370 to the pre-drivers 335 and 325, respectively, control the outputs to the gates of the power FETs 340 and 320 within the supply range provided by the pre-driver controls (corresponding to input terminals 120 and 140 as shown in FIG. 1).

The selected voltage (i.e., 10.5 V from the gate of MN3, taking into account a voltage drop due to the threshold voltage of MN3) is the positive voltage supply for the high-side pre-driver 335 and V_SW (i.e., 5 V with respect to ground) is the negative voltage supply for the high-side pre-driver 335. The difference between these voltages is approximately 5.5 V, which is within the required range of voltage to safely drive the high-side FET 340. While the high-side FET 340 is turned on, current may flow from V_BAT through the high-side FET 340 and through L1 to ground, which stores energy in L1.

While the foregoing examples are shown having certain voltage requirements and using certain components, it should be noted that the inventive concept may be applied to other voltage requirements and may use other components. For instance, the breakdown voltage of the zener diode D2 may be adjusted to achieve a different pre-driver supply voltage. Also, while some elements are shown as representing only one component, these elements may represent a plurality of components. For example, the external capacitor C_BST in FIGS. 3 and 4 may represent a single capacitor, or may represent a plurality of capacitors arranged in series and/or parallel to achieve a desired capacitance.

Additionally, in the foregoing examples some components are shown directly connected to certain nodes or terminals. However, as is known in the art and falling within the scope of the claims, other components may be placed between a component, node or terminal and another component, node or terminal to achieve a known effect. For instance, a resistive element may be placed between a source voltage and an inductor to limit current flow and/or prevent a short circuit condition. Other component inclusions or exclusions and associated effects are recognized by those of ordinary skill. The components shown in the examples are meant to be illustrative and not limiting.

Figure 5:
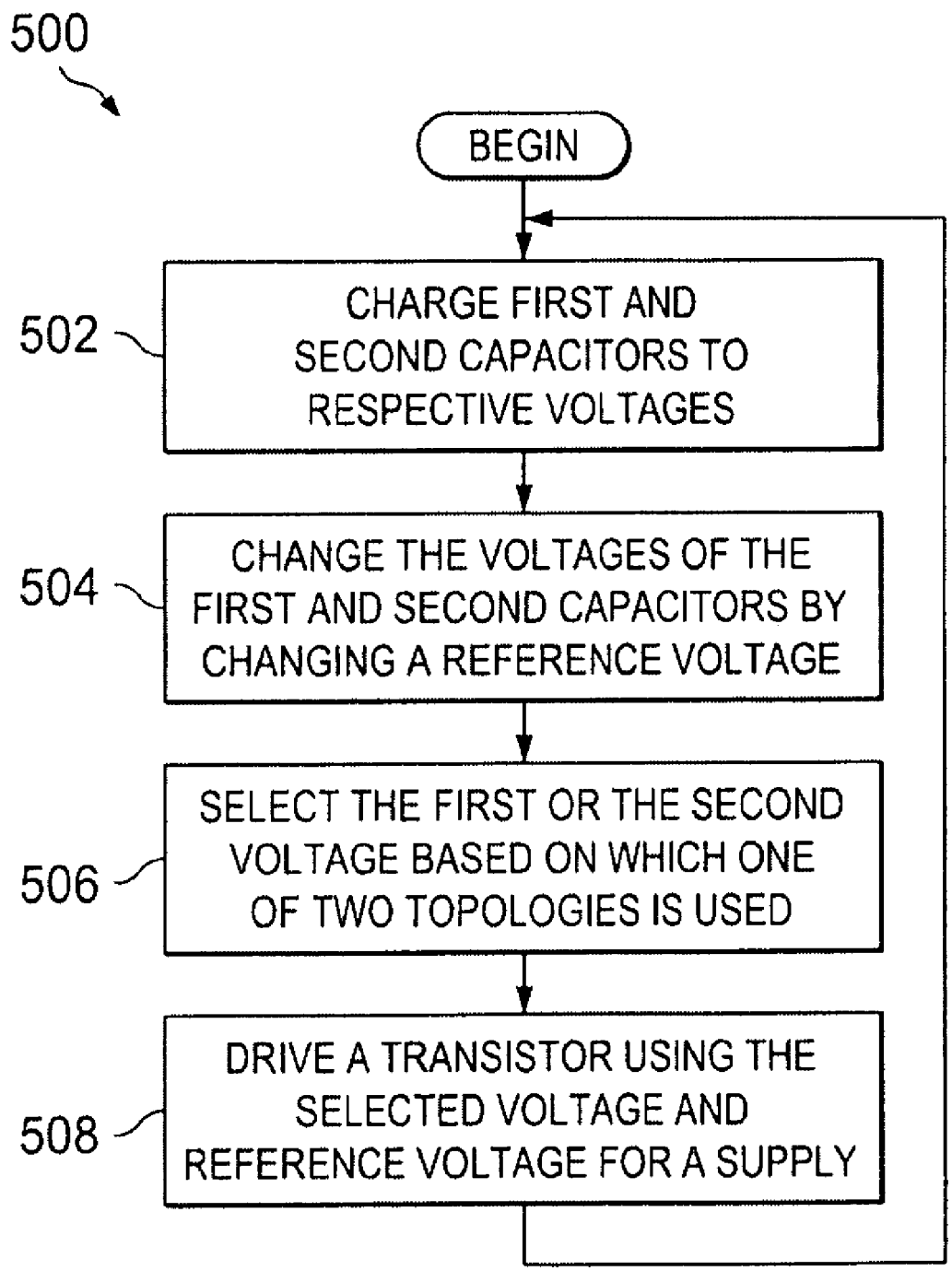
FIG. 5 is a flowchart representative of an example method to control a high-side pre-driver.

FIG. 5 is a flowchart representative of an example method 500 to control a high-side pre-driver. The example method 500 begins at block 502 with a charge phase. During the charge phase, a first capacitor and a second capacitor (e.g., C_BST and C1 in FIGS. 3 and 4) are charged to a first voltage and a second voltage, respectively. The first voltage and the second voltage may not be the same and the positively charged plates of the first and second capacitors may have different voltages with respect to ground. When the capacitors are charged, the method 500 ends the charge phase and enters a discharge phase at block 504. In the discharge phase, the method 500 changes the first voltage and the second voltage by changing a swing voltage (e.g., V_SW). The first capacitor and the second capacitor, each having a terminal tied to V_SW, are shifted in voltage with respect to ground, causing the first voltage and the second voltage to shift according to the voltage shift at V_SW (block 504).

The method 500 selects one of the first voltage or the second voltage at block 506 based on the topology used (e.g., boost or buck-boost). This can be done with a field effect transistor, such as the transistor MN3 shown in FIGS. 3 and 4. The first voltage may be higher or lower than the second voltage at the time a voltage is selected by the method 500 based which one of two topologies is used. The selected voltage is the positive voltage supply to drive a transistor at block 508. The pre-driver shown in FIGS. 2-4 may be used to drive the transistor. The method 500 may be iterative to continuously function as a switched-mode power supply and therefore transfers control to block 502 to restart the method 500.

Although certain methods, apparatus, and articles of manufacture have been described herein, the scope of coverage of this patent is not limited thereto. On the contrary, this patent covers all apparatus, methods and articles of manufacture fairly falling within the scope of the appended claims either literally or under the doctrine of equivalents.

What is claimed is:

1. A method comprising:
    charging a first terminal associated with a first capacitive element to a first voltage with respect to ground and a second terminal associated with a second capacitive element to a second voltage with respect to ground;
    changing the first voltage and the second voltage with respect to ground by changing a swing voltage;
    selecting one of the first voltage or the second voltage based on a first switched-mode power supply topology or a second switched-mode power supply topology; and
    driving a transistor using the selected voltage.

2. A method as defined in claim 1, further comprising discharging the first terminal or the second terminal.

3. A method as defined in claim 2, wherein discharging the first terminal or the second terminal is done in response to the selecting one of the first voltage or the second voltage.

4. A method as defined in claim 1, wherein the first switched-mode power supply topology comprises a boost topology and the second switched-mode power supply topology comprises a buck-boost topology.

5. A method as defined in claim 1, wherein the swing voltage is electrically coupled to a third terminal and a fourth terminal, wherein the third terminal is associated with the first capacitive element and the fourth terminal is associated with the second capacitive element.

6. A method as defined in claim 1, wherein when selecting the first voltage or the second voltage, the first voltage is higher or lower than the second voltage based on the first switched-mode power supply topology or the second switched-mode power supply topology.

7. A method as defined in claim 1, wherein driving the transistor using the selected voltage comprises using the selected voltage as the upper supply voltage and the swing voltage as the lower supply voltage.

8. A circuit comprising:
    an input and an output;
    a first capacitive element to provide a first voltage and a second capacitive element to provide a second voltage;
    a first switching element to change the first voltage and the second voltage with respect to ground;
    a second switching element to select one of the first voltage or the second voltage based on a first switched-mode power supply topology or a second switched-mode power supply topology; and
    a pre-driving element to drive a transistor using the selected voltage as an upper output limit and the swing voltage as a lower output limit.

9. A circuit as defined in claim 8, wherein the first switched-mode power supply topology comprises a boost topology and the second switched-mode power supply topology comprises a buck-boost topology.

10. A circuit as defined in claim 8, wherein the first voltage when changed by the first switching element is higher or lower than the second voltage when changed by the first switching element based on the first switched-mode power supply topology or the second switched-mode power supply topology.

11. A circuit as defined in claim 8, wherein the first capacitive element or the second capacitive element further discharge to change the first voltage or the second voltage.

12. A circuit as defined in claim 8, wherein the first capacitive element or the second capacitive element further discharge in response to the second switching element selecting the first voltage or the second voltage.

13. A pre-driver control comprising:
an input and an output;
a first bootstrap to provide a first voltage and a second bootstrap to provide a second voltage;
a first switch to change the first voltage and the second voltage;
a second switch to select one of the first voltage or the second voltage based on a first switched-mode power supply topology or a second switched-mode power supply topology; and
a pre-driver to drive a transistor.

14. A pre-driver control as defined in claim 10, wherein the pre-driver uses the selected voltage as a supply voltage.

* * * * *